United States Patent
Lutz

[19]

[11] Patent Number: 5,839,751
[45] Date of Patent: Nov. 24, 1998

[54] GAS BAG PASSENGER RESTRAINT MODULE

[75] Inventor: Joachim Lutz, Schechingen, Germany

[73] Assignee: TRW Occupant Restraint Systems GmbH, Alfdorf, Germany

[21] Appl. No.: 692,874

[22] Filed: Aug. 2, 1996

[30] Foreign Application Priority Data

Aug. 4, 1995 [DE] Germany ................. 195 28 754.1

[51] Int. Cl.$^6$ ........................................... B60R 21/16
[52] U.S. Cl. ............................. 280/728.2; 280/732
[58] Field of Search .................. 280/728.2, 728.1, 280/732, 743.1

[56] References Cited

U.S. PATENT DOCUMENTS

| | | | |
|---|---|---|---|
| 4,964,654 | 10/1990 | Bishop et al. | 280/728.2 |
| 5,069,480 | 12/1991 | Good | 280/728.2 |
| 5,096,222 | 3/1992 | Komerska et al. . | |
| 5,261,692 | 11/1993 | Kneip et al. . | |
| 5,310,213 | 5/1994 | Mori | 280/732 |
| 5,332,256 | 7/1994 | Lauritzen et al. | 280/728.2 |
| 5,405,164 | 4/1995 | Paxton et al. | 280/728.2 |
| 5,433,472 | 7/1995 | Green et al. | 280/732 |

FOREIGN PATENT DOCUMENTS

| | | | |
|---|---|---|---|
| 0650871 | 5/1995 | European Pat. Off. . | |
| 2256541 | 10/1990 | Japan . | |
| 4-55143 | 2/1992 | Japan | 280/728.2 |
| 569789 | 3/1993 | Japan . | |
| 06293245 | 10/1994 | Japan . | |
| 06298033 | 10/1994 | Japan . | |
| 6305387 | 11/1994 | Japan . | |
| 3011543 | 3/1995 | Japan . | |
| 3013185 | 4/1995 | Japan . | |
| 721454 | 4/1995 | Japan . | |
| 07137594 | 5/1995 | Japan . | |
| 2237538 | 8/1991 | United Kingdom | 280/728.2 |
| WO93/08042 | 4/1993 | WIPO | 280/728.1 |

Primary Examiner—Eric D. Culbreth
Attorney, Agent, or Firm—Tarolli, Sundheim, Covell, Tummino & Szabo

[57] ABSTRACT

A gas bag restraining module having a housing (10), an inflation device (12) located in the latter, said inflation device providing a volume of pressurized gas after activation, and having a folded gas bag (50), which has an attachment section fixed to the housing (10) and surrounding an inflation aperture, should be adapted to the use of an inflation device, which is known in the form of a "heated gas inflator". For this purpose, the invention provides that the inflation device has a cylindrical pressurized gas container (12), the housing (10) is formed with a trough-shaped base to accommodate the pressurized gas container (12) and a box-shaped upper section, the attachment section of the gas bag (50) is provided with an attachment frame (40) and the attachment frame (40) is inserted in the upper section of the housing (10).

9 Claims, 3 Drawing Sheets

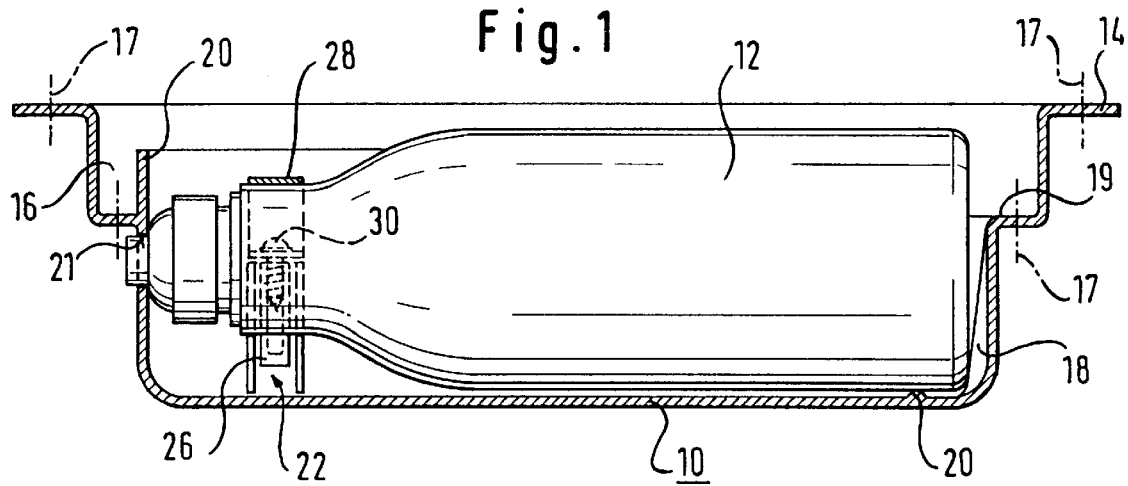
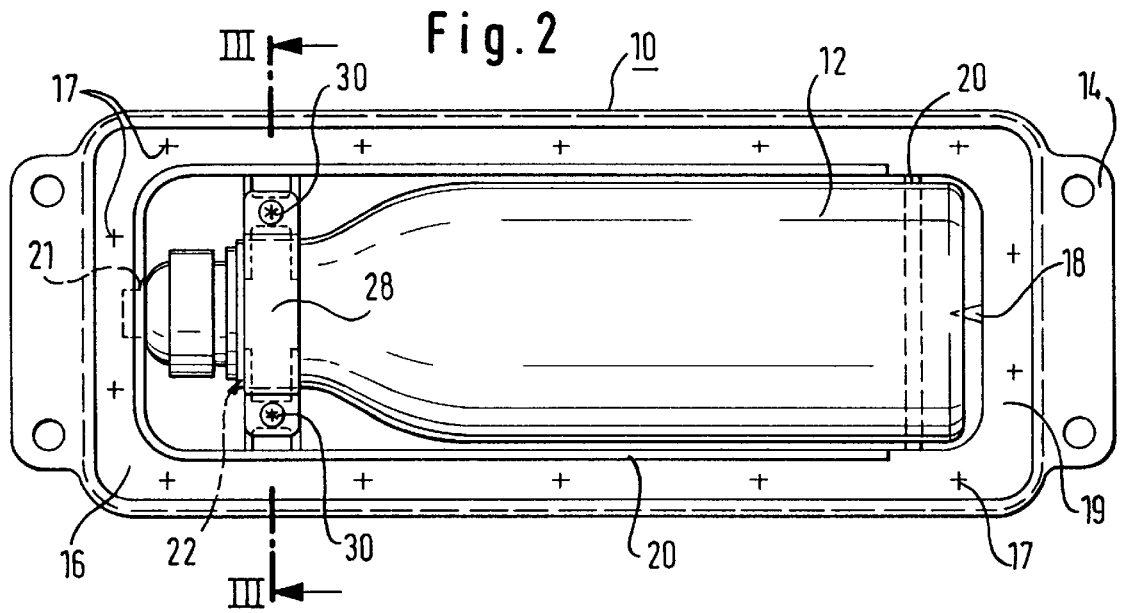
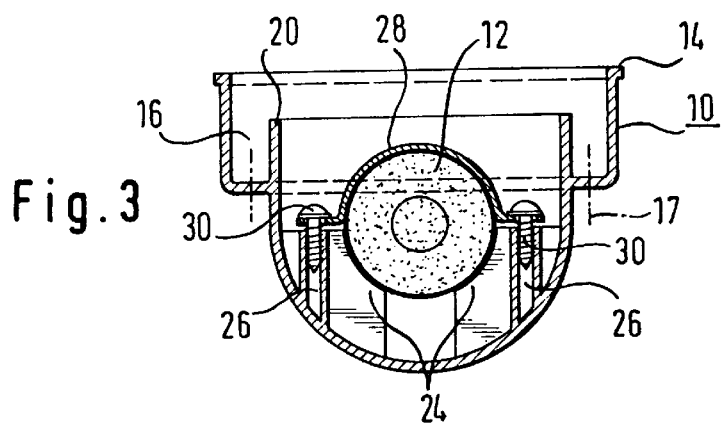

5,839,751

GAS BAG PASSENGER RESTRAINT MODULE

The invention relates to a gas bag passenger restraint module with a housing, an inflation device located in the housing and a folded gas bag which has an attachment section fixed to the housing and defining an inflation aperture in the gas bag.

Such gas bag modules are known in the art of vehicle passenger safety systems. Normally, a so-called gas generator having a pyrotechnical charge is used as the inflation device, the pyrotechnical charge releasing a predetermined volume of gas in a very short time once activated. Recently, however, increased efforts have been made to develop gas bag restraint modules which operate with a much smaller pyrotechnical charge because the use of such pyrotechnical charges is not without problems, particularly in respect of environmental compatibility. The invention provides a gas bag passenger restraint module which is adapted to use an inflation device which has a pressurized gas container, in particular of the "heated gas inflator" type. With this type of inflation device, a predetermined volume of gas is released to inflate the gas bag, the gas having been enclosed under high pressure in the pressurized gas cylinder. Upon activation of the inflation device, a chemical reaction with the gas contained in the pressurized gas container is also initiated, whereby the temperature of the released gas is increased, thus leading to a corresponding increase in its volume.

According to the invention, the inflation device has a cylinder type pressurized gas container, and the housing accommodating the gas container is designed with a trough-shaped base to accommodate the pressurized gas container and a box-shaped upper section. The attachment section of the gas bag has an attachment frame. The attachment frame is inserted into an upper section of the housing. This design of the gas bag restraining module offers the conditions for a particularly easy and safe assembly of the pressurized gas container.

Further advantages and features of the invention ensue from the following description and from the enclosed drawing:

FIG. 1 shows a schematic cross-section through the housing of the gas bag restraining module according to the invention with fitted pressurized gas container;

FIG. 2 is a top view of the housing of FIG. 1;

FIG. 3 shows a cross-section along the line III—III of FIG. 2;

Figure 4:
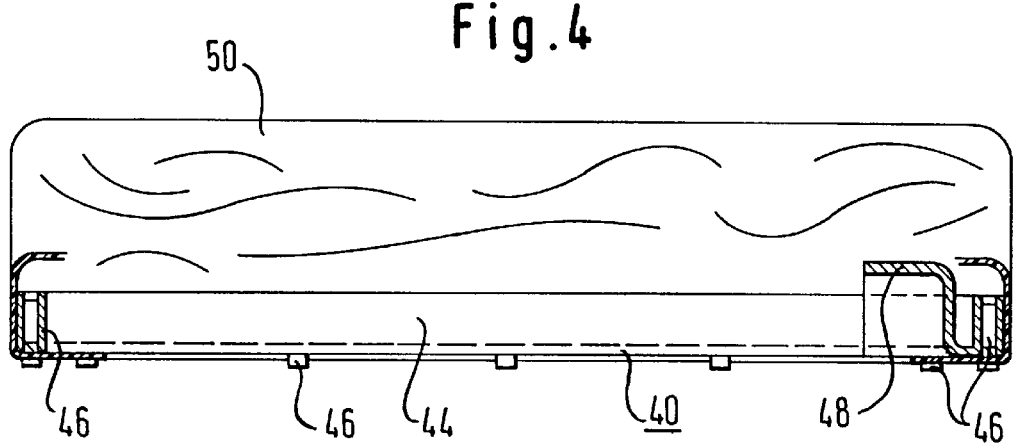
FIG. 4 shows a schematic cross-section through the attachment frame of the gas bag restraining module according to the invention, with folded gas bag.

FIGS. 1 to 3 show a housing of a gas bag restraining module according to the invention. The housing 10 has a trough-shaped base which is adapted to the shape of a pressurized gas cylinder 12 that is to be accommodated in the housing, and a box-shaped top section which is arranged at the open end of the trough-shaped base. The pressurized gas cylinder 12 contains gas under pressure, from which it escapes in the head area, one the gas bag restraining module is activated. Furthermore, on activation, a chemical reaction is initiated in the pressurized gas which causes the temperature of the released gas to be increased, and hence leads to an increase in its volume.

The box-shaped upper section has, on its side opposite the trough-shaped base, a surrounding rim 14 which is extended at the front ends of the housing 10 and is provided with openings for attaching the housing to an assigned mounting in the vehicle. Furthermore, in the box-shaped upper section, a channel 16 is formed, which runs along a first end and the two long sides of the housing 10. On a second, in place of the channel 16, is a shoulder 19 at the transition between the box-shaped upper section and the trough-shaped base. In the channel 16 and along the shoulder 19 are several holes 17, which are only suggested schematically in the FIGS. 1–3.

For secure attachment of the pressurized gas cylinder 12 in the housing 10, the trough-shaped base includes a rib 18, a web 20 and an opening 21. The rib 18 is developed at the second end of the housing, where the shoulder 19 is also developed. At the lowest point of the trough-shaped base of the housing 10, the rib has its greatest height and narrows in the vicinity of the shoulder 19. The web 20 runs, at constant elevation, from one long side of the housing 10 across the trough-shaped base, to the other long side of the housing. The opening 21 is developed at the first end of the housing 10, which is located opposite the rib 18. Furthermore, a mounting 22 is provided which is developed near the first end of the housing opposite the rib 18 and consists of a support 24 and two support studs 26 developed on both sides of the support 24, said studs each being provided with a hole running along their longitudinal direction.

The housing 10 is manufactured by a casting process. In this way, all the features of the housing 10 described can be directly molded during its manufacture, in a simple manner. Compared with the known housings of gas bag restraining modules, which generally have continuously cast sections or are assembled from various individual elements, this provides considerable advantages in manufacture.

The pressurized gas cylinder 12 is attached to the housing 10 in the following way. The pressurized gas cylinder 12 is placed in the housing 10 in such a way that a cylindrical lug at a first end of the pressurized gas cylinder 12 first of all engages in the opening 21. The base or second end of the pressurized gas cylinder is then inserted into the trough-shaped base of the housing 10, and by virtue of the rib 18, the pressurized gas cylinder is automatically aligned in an axial direction. At the same time, the web 20 guides the second end of the pressurized gas cylinder 10 into its correct position. By virtue of fixing the first end of the pressurized gas cylinder in the opening 21, the neck of the bottle automatically comes to rest in the mounting 22. A strap 28 is now placed over the neck of the pressurized gas cylinder 12, said strap being attached to the support studs 26 by means of self-tapping screws which are screwed into the holes in the support studs 26. This completes the assembly of the pressurized gas cylinder 12 in the housing 10 and a preassembled unit is now available, which is easy to handle.

Figure 5:
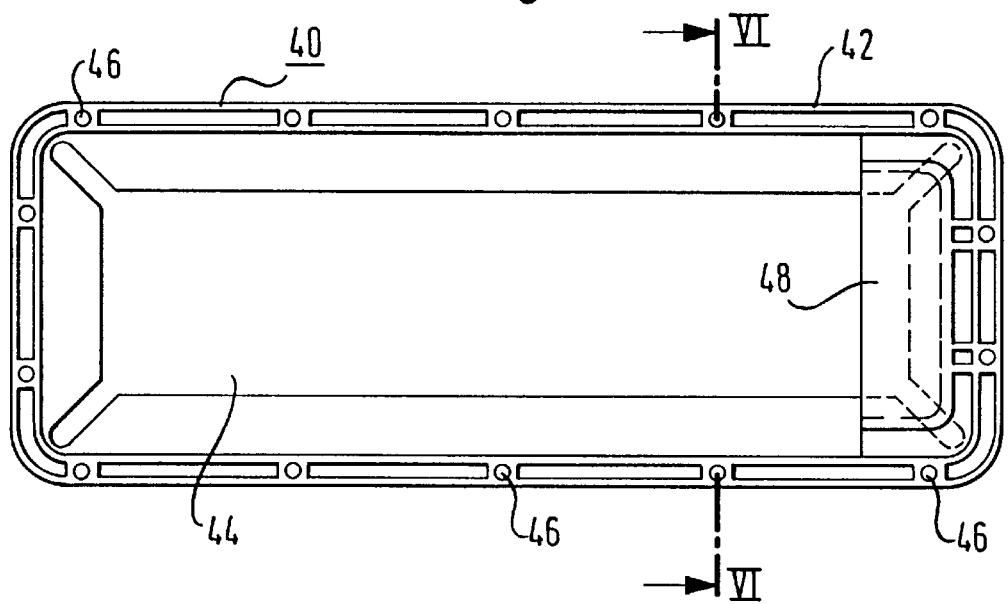
FIG. 5 shows a schematic top view of the attachment frame of FIG. 4 with the gas bag removed.
Figure 6:
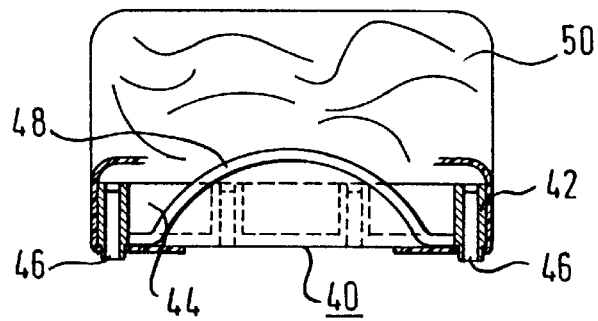
FIG. 6 shows a cross-section along the line VI—VI of FIG. 5.

FIGS. 4 to 6 show an attachment frame of a gas bag restraining module according to the invention. The attachment frame 40 has a rim 42 which surrounds an internal opening 44. Several attachment sleeves 46 are developed in the rim 42 which slightly protrude below one side of the attachment frame 40 and which are each provided with a hole which extends in the longitudinal direction of the attachment sleeves 46; the arrangement of the attachment sleeves 46 corresponds to the arrangement of the holes 17 in the housing 10. At one front end the attachment frame 40 is provided with a retaining section 48 which is intended, together with the rib 18, the web 20 and the opening 21, to firmly secure the pressurized gas bottle 12 in a defined position. The retaining section 48 protrudes from the rim 42 into the inside of the attachment frame 40 and in the cross-sectional view of FIG. 6, has the form of a segment of a circle.

The attachment frame 40 is also manufactured by a casting process. By this method all the features of the attachment frame 40 described can be simply and directly developed during manufacture. Suitable materials for the attachment frame 40 and for the housing 10 are, in particular, fibre-reinforced, thermoplastic materials and also castable aluminium and magnesium alloys.

The attachment frame 40 thus developed is connected to a gas bag 50 to form a pre-assembled unit. To do this the attachment frame 40 is inserted through the inflation aperture of the gas bag and into the latter and located on an attachment section of the gas bag that surrounds the inflation opening, in such a way that the protruding sections of the attachment sleeves 46 pass through holes which are formed in the attachment section. By this method the gas bag 50 is fixed to the attachment frame 40. The gas bag can be subsequently folded over the attachment frame 40, so that it takes on a compact shape and does not stick out significantly laterally beyond the outer rim of the attachment frame 40. Finally, the gas bag 50 is fixed in this state, so that it cannot become unfolded again during further handling of the unit formed by it and the attachment frame 40.

Figure 7:
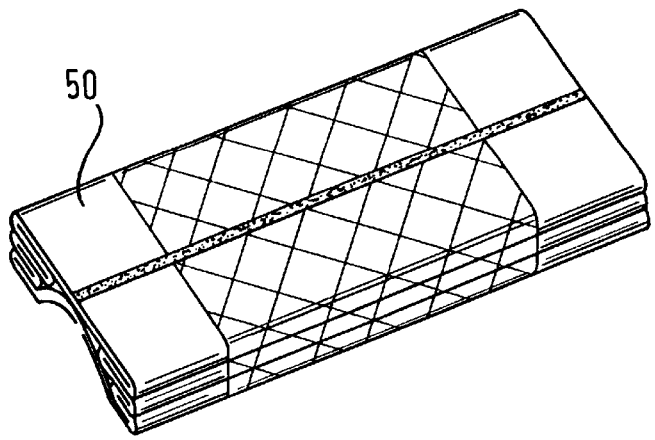
FIG. 7 shows a perspective view of a folded gas bag.
Figure 8:
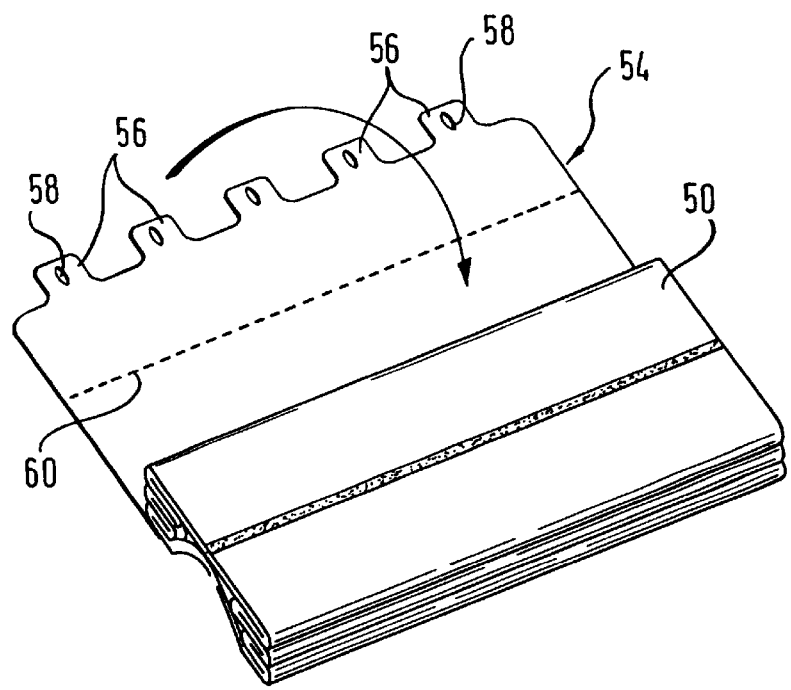
FIG. 8 shows a perspective view of a folded gas bag in an embodiment which is an alternative to the embodiment of FIG. 7.
Figure 9:
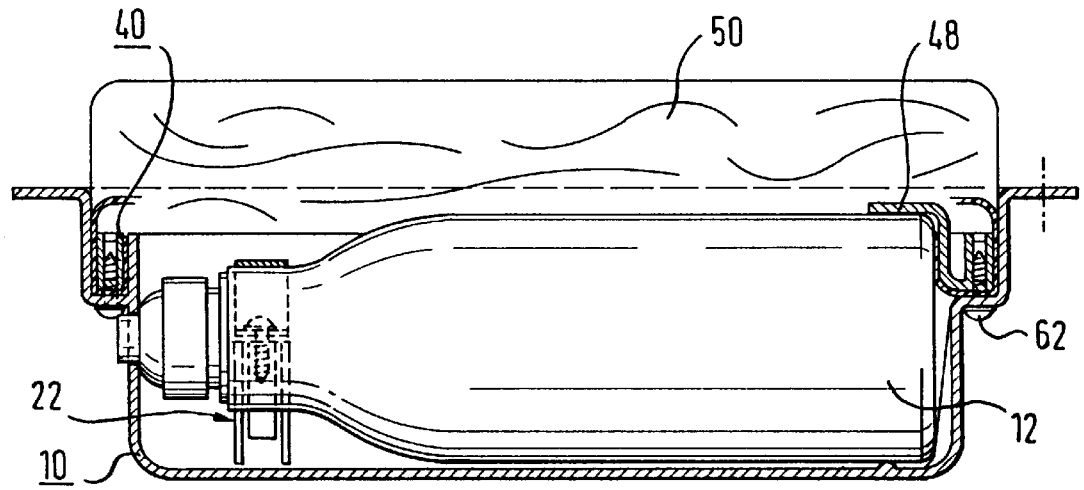
FIG. 9 shows a cross-section through a fitted gas bag restraining module according to the invention.

This fixing can be done by a known method using a plastic foil which is passed round the folded gas bag like a banderole, as shown schematically in FIG. 7, or using a fixing device 54 (see FIG. 8), of which one long side is fixedly connected to the gas bag 50. The other long side of the fixing device 54 has tongues 56 in which openings 58 have been made. The centre section of the fixing device 54 located between the two long sides has a perforation 60. When the gas bag 50 is folded into the desired compact shape, as shown in FIG. 8, the fixing device is folded over the gas bag and the openings 58 of the tongues 56 are hung on the protruding sections of the attachment sleeves 46, so that the gas bag is fixed in position. The perforation 60 determines a tear-off line, along which the fixing device 54 tears off when the gas bag restraining module is activated, thus releasing the gas bag. If the gas bag 50 is fixed in this way, then the unit, made up of the gas bag and the attachment frame 40, can be handled without difficulty, particularly for mounting on the pre-assembled housing 10.

Assembly of the housing 10 containing the pressurized gas cylinder 12 on the attachment frame 40 containing the gas bag 50 is particularly straightforward by virtue of the practical design of the two parts of the housing. The attachment frame 40 is placed on the housing 10 and in the channel 16 and correct positioning of the two parts relative to each other is guaranteed by the channel 16 and the shoulder 19: the design of the retaining section 48 on the attachment frame makes mutual co-ordination of the two parts clear, thus excluding the possibility of incorrect assembly. After placing the attachment frame 40 on the housing 10, self-tapping screws 62 are screwed through the holes 17 into the holes 46 in the attachment sleeves 42. These screws 62 are preferably similar to the screws 30, which are used to attach the strap 28 to the support studs 26, so that the components needed to assemble the gas bag restraining module according to the invention are reduced to a minimum. After bolting together the attachment frame 40 and the housing 10, the pressurized gas cylinder 12 is firmly secured against undesirable movements in any direction, since the retaining section 48 presses against the section of the wall of the pressurized gas cylinder 12 that is diametrically opposite to the section of wall where the web 20 acts. Thus, the pressurized gas cylinder 12 is held in radial direction by the opening 21, the mounting 22 and the web 20, together with the retaining section 48 and in axial direction by the opening 21 together with the rib 18 and, additionally, by the mounting 22.

This design of the housing of the gas bag restraining module produces a number of advantages. As the attachment frame and the housing are cast, the elements used to locate the pressurized gas cylinder can be developed in a very straight-forward way as integral parts of the housing and the attachment frame. The channel 16 protects the attachment section of the gas bag 50 in the area where possibly hot pressurized gas escapes from the pressurized gas cylinder, so that the wall of the gas bag in this area cannot be damaged. Because the gas bag restraining module is divided into two units that can be separately pre-assembled, this provides very great flexibility in manufacturing. Finally, despite simple assembly, the pressurized gas cylinder 12 is safely located in the housing.

What is claimed is:

1. A gas bag passenger restraint module having a housing, an inflation device located in said housing, said inflation device providing a volume of pressurized gas upon actuation, and a folded gas bag with an attachment section fixed to said housing and defining and inflation aperture, wherein;

said inflation device has a cylinder-shaped pressurized gas container;

said housing has a trough-shaped base to accommodate the pressurized gas container and a box-shaped upper section;

said attachment section of the gas bag being provided with an attachment frame;

said attachment frame being inserted in said box-shaped upper section of the housing; and an accommodation for a neck part of said pressurized gas container being provided in the housing and providing a support with a strap which is connected by self-tapping screws to support studs formed on the housing.

2. The gas bag restraint module according to claim 1, wherein said attachment frame has a retaining section shaped to fit along a base part of said pressurized gas container on a side opposite said housing.

3. The gas bag restraint module according to claim 2, wherein a first end of said housing opposite a second end facing the base part of the pressurized gas container has an opening into which a projection on the pressurized gas container engages.

4. The gas bag restraint module according to claim 1, wherein said housing has a rib which is in contact with a base part of said pressurized gas container and a web that is in contact with a wall portion of said pressurized gas container adjacent to said base part.

5. The gas bag restraint module according to claim 1, wherein said housing and said attachment frame each consist of a one piece cast material.

6. A gas bag passenger restraint module having a housing, an inflation device located in said housing, said inflation device providing a volume of pressurized gas upon actuation, and a folded gas bag with an attachment section fixed to said housing and defining an inflation aperture, wherein:

said inflation device has a cylinder-shaped pressurized gas container;

said housing has a trough-shaped base to accommodate the pressurized gas container and a box-shaped upper section;

said attachment section of the gas bag being provided with an attachment frame; and said attachment frame being inserted in said box-shaped upper section of the housing, and having attachment sleeves which traverse openings formed in the attachment section of the gas bag and into which self-tapping screws engage, locating the attachment frame on the housing.

7. The gas bag restraint module according to claim 6, wherein said gas bag has an essentially rectangular fixing part with a long side which is fixedly connected to the gas bag close to the attachment section thereof, another long side of said fixing part being located on the attachment frame by means of tongues, said tongues having openings, into which said attachment sleeves engage, and having a middle section which is located between said long sides and over the folded gas bag and has a perforation which is torn open by the gas bag upon unfolding thereof.

8. The gas bag restraint module according to claim 6 further including means for interconnecting said housing and said pressurized gas container as a preassembled unit and means for connecting said gas bag and said attachment frame to said preassembled unit.

9. The gas bag restraint module according to claim 6 further including means for interconnecting said gas bag and said attachment frame as a preassembled unit and means for connecting said housing and said pressurized gas container to said preassembled unit.

\* \* \* \* \*